Feb. 17, 1959 A. VON WANGENHEIM 2,873,609
THERMALLY RESPONSIVE DEVICE
Filed April 19, 1955
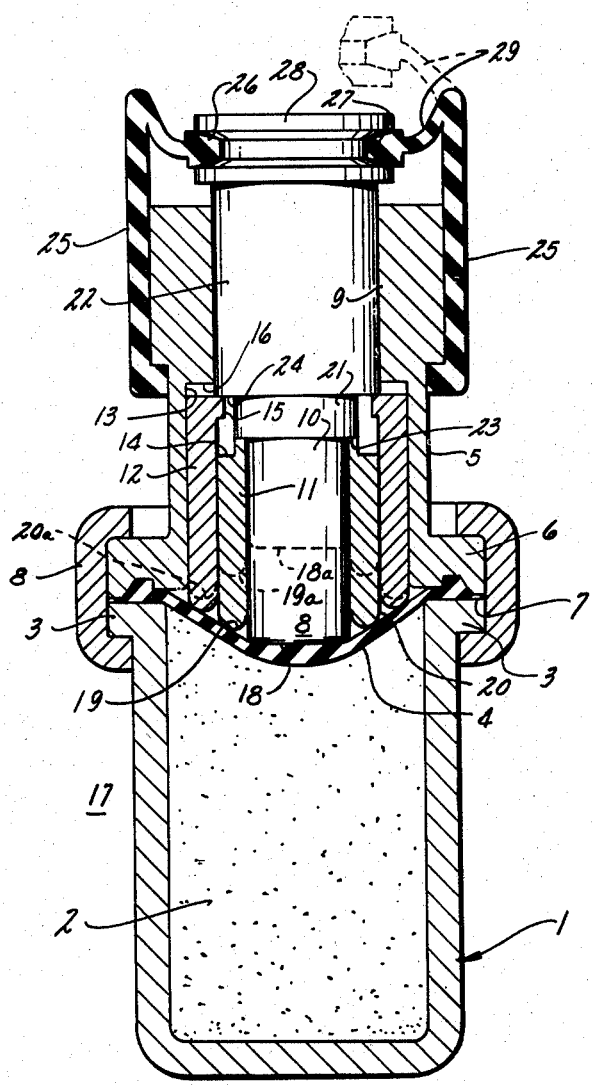
INVENTOR.
ADOLF VON WANGENHEIM
BY
SMITH, OLSEN & KOTTS
ATTORNEYS United States Patent Office 2,873,609
Patented Feb. 17, 1959

2,873,609

THERMALLY RESPONSIVE DEVICE

Adolf Von Wangenheim, Detroit, Mich., assignor, by mesne assignments, to Antioch College, Yellow Springs, Ohio, a corporation of Ohio Application April 19, 1955, Serial No. 502,412

1 Claim. (Cl. 73—358)

This invention relates to a thermostat of the type actuated by a temperature responsive or temperature sensitive material, particularly a temperature sensitive material which has the property of expanding during fusion and contracting on solidification at a specific temperature or range of temperatures. The invention is particularly concerned with the elimination of friction in the moving parts of such a thermostat so that it will operate under relatively lighter loads and closer temperature differentials, than have heretofore been possible.

The type of thermostat with which I am concerned has become well known in the art. The temperature sensitive material in the form of an expansible pellet is contained in a cup or chambered element, one wall of which is closed by a resilient diaphragm. A cylinder and piston is positioned on the side of the diaphragm opposite the temperature sensitive material. When the temperature of the ambient fluid is raised to a predetermined point, the temperature sensitive material undergoes fusion with a resulting expansion; thereby moving the resilient diaphragm and in turn thrusting the piston away from the expansible pellet.

When the temperature of the ambient fluid is lowered below the fusion temperature or range of temperatures, the temperature sensitive material contracts, and in order to return the piston to its initial "low temperature" position, the piston is provided with a spring. This spring moves the piston toward the diaphragm in accordance with the contraction experienced by the temperature sensitive material.

The temperature sensitive material will fuse and solidify over a "range of temperatures" when the temperature sensitive material includes a plurality of different component materials. In such cases fusion will include a gradual softening of the material until the volumetric expansion is reached, and the fusion process will in effect take place over a "range" of temperatures. Similarly solidification of the temperature sensitive material will include a gradual hardening thereof until the contracted state is reached, and the solidification process will in effect take place over a range of temperatures.

Some of the earlier developed thermostats of the type under consideration presented a disadvantage in that ambient liquids tended to leak into the piston area, particularly under the partial vacuum created by contraction of the pellet upon cooling of the ambient liquid. Such leakage resulted in loss of calibration.

One of the most successful methods of solving this problem involves the use of a pliable plastic plug which is positioned in the cylinder between the diaphragm and the piston. Such plugs tends to have a tight fit and, in all positions of the diaphragm and piston, occupy the full volume between diaphragm and piston. This tight fit, together with the compressive action of the spring, tends to press the piston tightly against the plug as the latter moves deeper into the unit as a result of contraction of the heat sensitive material. The pressing of the piston against the plug is quite successful in preventing suction of liquids from either direction into the piston area. However, the pliable plug type thermostat has itself presented a problem in that the friction caused by its movement inwardly and outwardly with the piston has prevented its use under relatively light spring loadings and under relatively close temperature differentials.

The term "temperature differentials" as used herein serves as a comparison between:

(1) The temperature or ranges of temperature of ambient fluid during which the piston moves into the cylinder, and (2) The temperature or ranges of temperature of ambient fluid during which the piston moves out of the cylinder. As indicated above, it is desirable to employ close temperature differentials. For example, suppose the thermostatic element is being utilized in conjunction with a valve in the water line of the cooling system for an internal combustion engine. When the temperature in said line rises above a certain predetermined value the valve should open and when the water line temperature falls below this predetermined value the valve should close. If the temperature in the line at which the piston closes the valve is appreciably less than the temperature at which the piston opens the valve (i. e. if the "temperature differential" is relatively great), a quantity of water having a temperature less than the predetermined temperature will flow through the valve before it closes, and conversely when the valve is closed a quantity of water having a temperature greater than the predetermined temperature will build up in front of the valve before it opens. The result will be an undesired fluctuation in the water line temperature and engine temperature.

To avoid high temperature differentials and the undesired effects resulting therefrom it is necessary that the thermostat piston be made responsive to ambient fluid temperatures to the same extent, whether said temperatures are increasing or decreasing.

In thermostats wherein a pliable plug is employed increase in the ambient fluid temperature will give a piston movement in accordance with volumetric increase of the temperature sensitive material but decrease in the ambient fluid temperature may not give a piston movement in accordance with volumetric decrease of the temperature sensitive material. This is due to the fact that the pliable plug offers considerable resistance to movement by the spring-urged piston. As a result the piston may lag behind the temperature responsive material during its contracting movement. This "lagging behind" of the piston results in the previously referred to "high temperature differentials."

The present invention provides a construction wherein the pliable plug is eliminated and frictional resistance to inward movement of the piston is at a minimum. The piston therefore does not "lag behind" the temperature responsive material and temperature differentials are kept low. Ability of the piston to keep pace with the temperature responsive material also prevents the build-up of any vacuum in the thermostat interior such as would draw in ambient fluid and destroy the thermostat's calibration.

It has been stated previously that the pliable plug type thermostat presents a problem in that the resulting frictional forces prevent the use of relatively light spring loadings. The use of light spring loadings is desirable in that the thermostat can thereby be made more responsive to temperature changes in the ambient fluid. Thus on cooling of the ambient fluid, the light spring will move the piston immediately in response to contraction of the temperature responsive material and there will be no time lag (as when a heavy spring must be employed to overcome the friction and inertia forces inherent in the use of pliable plugs).

Therefore, it is an object of this invention to provide a thermostat which eliminates a substantial proportion of the friction experienced in the use of pliable plugs, whereby to adapt the thermostat for operation under light loadings and close temperature differentials.

It is a further object to prevent the entry into the thermostat unit of ambient liquid or other materials, whereby to preserve the calibration of the thermostat and prevent the build-up of the corrosive or friction-producing forces which might interfere with easy movement of the piston.

Other objects of this invention will appear in the following description and appended claim, reference being had to the accompanying drawings forming a part of this specification wherein like reference characters designate corresponding parts in the several views.

The objectives of the invention are secured in a thermostat which comprises a plurality of circumferential bushings slidable on the piston and each other. Said piston and bushings are provided with shoulders for the purpose of limiting the amount of motion of each bushing. Such limited motions require comparatively small energy expenditures, and it is therefore feasible to employ comparatively light spring loadings and close temperature differentials.

In the drawings:

The figure is a cross sectional view of one embodiment of the invention with the temperature sensitive material in a contracted or low temperature state.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a cup-like vessel 1 of heat-conducting material in which is positioned a pellet of temperature sensitive material 2.

The temperature sensitive material which expands and contracts on change of temperature is usually a diphenyl, dibromobenzene, dichlorobenzene, and like substances. These are usually supplied in the form of a pellet with other materials usually heat conducting materials, such as graphite, copper, carbon and so forth; and binding materials such as resins.

There is provided at the mouth of vessel 1 a shoulder-forming wall 3, and on the formed shoulder there is positioned a rubber diaphragm 4. A housing 5 overlies the diaphragm and is provided with a wall portion 6 for clampingly engaging the peripheral edge 7 of said diaphragm. A ring 8 is provided for effecting this clamping engagement. The rubber diaphragm is clamped quite securely at its periphery to avoid any possible leakage of the temperature sensitive materials from the cup. It is also the usual practice to make the center portion of the diaphragm somewhat thicker in cross section than the outer portions of the diaphragm. Since the center of the diaphragm is more subject to stretch and resulting strain, this increased thickness causes a substantial increase in the life of the diaphragm. It will be noted that the drawing shows the initial position of the diaphragm as being curved downwardly. This position permits a substantial expansion of material 2 and a corresponding upward movement of the diaphragm without a substantial stretching of the diaphragm, thus also contributing to its longer life.

Upward movement of diaphragm 4 is transmitted to a piston 8 which is slidably positioned in bore 9 formed in housing 5. The lower end 10 of piston 8 is encircled by a bushing sleeve 11, and this sleeve is in turn encircled by a bushing sleeve 12. Sleeve 12 is slidably positioned in bore 13 of housing 5. Preferably the motions of sleeves 11 and 12 are limited, and for this reason sleeve 11 is provided with a shoulder-forming undercut 14, sleeve 12 is provided with a motion-limiting wall 15, and housing 5 is provided with a motion-limiting shoulder 16. Although the drawing shows two bushings it will be understood that any number may be used.

The ambient fluid 17 in which vessel 1 is positioned may be a liquid or gas, depending on the type of installation in which it is desired to operate the thermostat. When the temperature of fluid 17 is raised above the fusion temperature or range of fusion temperatures of material 2 said material expands and causes diaphragm 4 to move from the "downwardly convex" position illustrated in Figure 1 to an "upwardly convex" position (not shown). In this upwardly convex position the lower face 18 of piston 8 takes the dotted line position 18a, and the lower faces 19 and 20 of sleeves 11 and 12 take the dotted line positions 19a and 20a.

When the temperature of fluid 17 is lowered below the fusion temperature or range of fusion temperatures of material 2 said material contracts and allows a light spring (not shown) to move piston 8 from its dotted line position to its full line position. It will be noted that piston 8 is formed with three portions of differing diameter. Thus lower portion 10 is of relatively small diameter, intermediate portion 21 is of larger diameter, and upper portion 22 is of still larger diameter. These portions of differing diameter provide a pair of shoulders 23 and 24. During movement of piston 8 from its dotted line position to its full line position shoulder 23 forces sleeve 11 to its full line position and shoulder 24 forces sleeve 12 to its full line position.

Sleeves 11 and 12 have limited motions and encounter relatively small frictional resistances during such motions. In contrast the use of a pliable plug material, as in the prior art constructions previously referred to, is accompanied by substantial frictional forces. As a result the prior art constructions must employ a rather heavy spring to return the piston to its "low temperature" position, whereas the construction of the present invention can employ a rather light spring to return the piston to its "low temperature" position.

In the prior art constructions the resistance of the plug material to being pushed by the piston may be so great that on temperature decrease, even with a heavy spring behind the piston, the temperature sensitive material may contract faster than the rate at which the piston is being moved by the spring. As a result there may be formed between the temperature sensitive material and the plug material a partial vacuum. This partial vacuum tends to suck some of the ambient fluid into the interior of the thermostat and thereby tends to destroy its calibration.

In the construction of the present invention there is no plug material employed and the only resistances to movement of piston 8 from its dotted line position to its full line position are the frictional resistances existing between housing 5, bushings 11, 12 and piston 8. As stated previously, these resistances are relatively small. Consequently, a relatively light spring can be employed to return piston 8 to its full line or "low temperature" position, and even with a light spring the piston will move exactly in accordance with the contracting movement of material 2 so as to prevent the build-up of a vacuum between material 2 and piston 8. Since there is no vacuum created there is no tendency for any of the ambient fluid to be sucked into the interior of the thermostat and the chances of destroying the calibration of the thermostat are reduced. Movement of the piston exactly in accordance with contracting movement of material 2 is further advantageous in that the aforementioned "temperature differentials" are kept low and the thermostat is made more responsive, time wise, to temperature changes in fluid 17.

There is shown in the drawings a flexible boot 25, the inner peripheral edge 26 of which is secured in an endless groove 27 formed in an extension 28 of piston 8. The radially extending wall 29 of boot 25 is of comparatively thin material whereby to permit flexing of said wall 29 in response to movement of piston 8. Thus as piston 8 moves in and out of housing 5 wall 29 will move or flex from its dotted line position to its full line position, and vice versa. During movement of piston 8 there is no stretching of the boot material and tendency of the boot material to rupture is at a minimum.

The function of boot 28 is to prevent dirt particles in ambient atmosphere 17 from working into the space below shoulder 16, and also into the space between shoulder 15 and shoulder-forming undercut 14. Entrance of dirt particles into such spaces would in time cause the bushings to stick so as to interfere with movement of piston 8. Boot 28 also protects the precision surfaces of piston 8 from corrosive liquids in atmosphere 17, and in this respect the boot preserves the "frictionless" character of these surfaces. When the thermostat is utilized in gaseous dirt-free atmospheres boot 28 need not be employed.

I claim:

The combination comprising a vessel having a wall opening; pressure-producing material in said vessel; a diaphragm closing the wall opening; a housing overlying the diaphragm; said housing having a relatively large diameter bore extending axially from adjacent the diaphragm and a relatively small diameter bore extending axially from the outer end of the first bore, the juncture between said bores defining a shoulder; a first bushing slidably engaging the wall of the first bore and having a lesser axial length than the spacing between the diaphragm and shoulder whereby to have limited axial movement in the large diameter bore; said first bushing having a projection extending radially inward from its outer end; a second bushing slidably engaging the internal face of the first bushing and having its inner end engaged with the diaphragm; said second bushing having its outer end spaced from the registering surface of the projection by a distance greater than the movement distance of said first bushing, whereby said second bushing has a greater movement distance than said first bushing; a piston having a large diameter section slidably engaged in said small diameter bore and having a small diameter section slidably engaged with the internal face of the second bushing; said piston also having an intermediate diameter section located between its aforementioned sections, the juncture between the small diameter section and intermediate diameter section forming a first annular abutment surface in registry with the second bushing, the juncture between the intermediate diameter section and large diameter section forming an annular abutment surface in registry with the first bushing; the small diameter piston section being free of projecting portions, whereby the diaphragm is enabled to move from an inwardly convexed position to an outwardly convexed position with the piston undergoing the greatest travel and the first bushing undergoing the least travel.

References Cited in the file of this patent

UNITED STATES PATENTS

| | | |
|---|---|---|
| 1,819,947 | De Lavaud | Aug. 18, 1931 |
| 2,034,538 | Schnell | Mar. 17, 1936 |
| 2,433,221 | Huber | Dec. 23, 1947 |
| 2,636,776 | Vernet | Apr. 28, 1953 |
| 2,694,415 | Dillon | Nov. 16, 1954 |